(12) United States Patent
Burke et al.

(10) Patent No.: US 6,805,523 B2
(45) Date of Patent: Oct. 19, 2004

(54) AUTO RACK RAILROAD CAR PANEL BUMPER GUARD

(75) Inventors: Michael K. Burke, Wheaton, IL (US); John D. Anderson, Aurora, IL (US); Walter J. Peach, Aurora, IL (US)

(73) Assignee: ZefTec, Montgomery, IL (US)

( * ) Notice: Subject to any disclaimer, the term of this patent is extended or adjusted under 35 U.S.C. 154(b) by 0 days.

(21) Appl. No.: 10/386,742

(22) Filed: Mar. 12, 2003

(65) Prior Publication Data

US 2003/0170089 A1 Sep. 11, 2003

Related U.S. Application Data

(62) Division of application No. 09/948,305, filed on Sep. 6, 2001, now Pat. No. 6,561,740.
(60) Provisional application No. 60/230,766, filed on Sep. 7, 2000.

(51) Int. Cl.[7] .................................................. B60P 7/16
(52) U.S. Cl. ........................ 410/87; 410/4; 410/26; 410/117
(58) Field of Search ........................ 410/87, 117, 4, 410/26, 99; 293/108, 128; 105/355, 374, 392.5, 404; 267/139

(56) References Cited

U.S. PATENT DOCUMENTS

| | | | |
|---|---|---|---|
| 5,239,933 A | 8/1993 | Murphy et al. | |
| 5,415,108 A | 5/1995 | Murphy et al. | |
| 5,527,139 A | 6/1996 | Bruder et al. | 410/117 |
| 5,579,697 A | 12/1996 | Burke | |
| 5,669,745 A | 9/1997 | Anderson | 410/87 |
| 5,687,650 A | 11/1997 | Murphy et al. | |
| 5,694,859 A | 12/1997 | Burke et al. | |
| 5,701,825 A | 12/1997 | Peach, Jr. | |
| 6,561,740 B1 * | 5/2003 | Burke et al. | 410/87 |
| 2002/0067970 A1 | 6/2002 | Thomson et al. | 410/87 |
| 2002/0127078 A1 | 9/2002 | Schorr et al. | 410/87 |

OTHER PUBLICATIONS

ZefTek Product Guide, published in 1998.

Holland Transportation Technology Rail Car Components Brochures, publication date unknown.

Thrall Bumper (photocopy of sample).

* cited by examiner

*Primary Examiner*—Stephen Gordon
(74) *Attorney, Agent, or Firm*—Bell, Boyd & Lloyd LLC

(57) ABSTRACT

The present invention reveals an auto rack sidewall panel bumper guard for auto rack railroad cars which eliminates contact between the vehicle door and the sidewall panel even in extreme heat. The bumper guard includes a pair of opposed mounting bases, a pair of extension arms connected to the mounting bases and a contact member connected to the arms opposite the mounting bases. The contact member has a lesser thickness than the arms to absorb the forces of the vehicle door.

33 Claims, 5 Drawing Sheets

AUTO RACK RAILROAD CAR PANEL BUMPER GUARD

The present application is a divisional of and claims the benefit of U.S. patent application Ser. No. 09/948,305, filed Sep. 6, 2001, now U.S. Pat. No. 6,561,740 B1 which claims the benefit of U.S. Provisional Patent Application 60/230,766, filed Sep. 7, 2000.

This invention relates in general to an improved auto rack railroad car panel bumper guard, and more particularly to an improved auto rack panel bumper guard which is adapted to be mounted on a sidewall panel of an auto rack railroad car to prevent vehicle doors from contacting the sidewall panel and thus prevent damage to the vehicles doors.

BACKGROUND OF THE INVENTION

The railroad industry employs a variety of railroad cars for transporting products including vehicles such as automobiles and trucks. Auto rack railroad cars transport newly manufactured vehicles, including automobiles, vans and trucks. Auto rack railroad cars, known in the railroad industry as auto rack cars, often travel thousands of miles through varying terrain. The typical auto rack car is compartmented, having two or three floors or decks, two sidewalls, a pair of doors at each end, and a roof. The sidewalls are constructed of numerous sidewall panels made of galvanized steel which are attached between vertical posts that are spaced evenly throughout the length of the auto rack car. On many cars, these sidewall panels are installed with: gaps between the vertically adjacent sidewall panels, gaps between the vertical posts and the sidewall panels, gaps between the roof and the sidewall panels, and gaps between the floor and the sidewall panels.

One problem with auto rack cars is the damage to newly manufactured vehicle doors which often occurs in the auto rack cars. Newly manufactured vehicles are loaded into the auto rack car by a person who drives the vehicle into the auto rack car. After correctly positioning the vehicle, the person must open the vehicle door to exit the vehicle. When the vehicle door is opened, the door can contact with the sidewall panels and/or the roof because there is only a limited amount of space between the vehicle and the sidewalls on any level or the vehicle and roof on the upper level of the auto rack car. This metal-to-metal contact can and often does scratch, dent and otherwise damage the finish of the door of the newly manufactured vehicle.

One method which has been used to solve the door damage problem is the application of mastic-backed tape over the sidewall panel as a guard for the vehicle doors. This method has been unsuccessful for several reasons. First, the surfaces of the sidewall panel which contact the adhesive side of the tape must be specially cleaned before the tape is applied. Otherwise, the tape will not properly adhere to the panels. Second, the extreme changes in temperature and the constant abuse from the sun and other elements of nature cause the tape to deteriorate and peel away. Third, the tape can be used only one time. Fourth, and finally, because the sidewall panels are taken off the auto rack car approximately every eight years to be regalvanized, the tape and any adhesive left on the panels must be completely removed. The tape and adhesive must be scraped off and/or removed by a special solvent. This removal process is difficult, costly and time-consuming. Therefore, the application of tape to protect the vehicle doors does not solve the problem. Certain such tapes may also be hazardous wastes.

Another method which has been used to prevent the vehicle doors from contacting the sidewall panels is to horizontally stretch a nylon belt across the sidewall panels and attach the ends of the belts to each end of the auto rack cars, approximately eighty feet apart. However, this method has been unsuccessful even with the addition of guides which are glued or welded to the vertical posts. The stretching of nylon belts between the two ends of the auto rack cars causes the belt to lose tension. This loss in tension causes the nylon belt to sag. When the nylon belt sags, it does not prevent the vehicle door from contacting the sidewall panels. To solve this problem, the nylon belt has to be constantly retensioned by ratchet tightening at one end of the auto rack car. Eventually, the nylon belts become completely stretched out and must be replaced. Accordingly, this method does not solve the problem.

A further method which has been used to prevent the vehicle doors from contacting the sidewall panels is to horizontally strap a rubber hose across the length of the auto rack car. However, this method has been unsuccessful because the rubber hose sags, because the straps holding the rubber hose often break, and because the hose does not sufficiently cover the sidewall panels. Thus, this method also fails to solve the problem.

Other methods such as attaching large rubber mats to the sidewall panels and coating the sidewall panels with a thin layer of spray-on foam have similarly failed to provide adequate protection for the newly manufactured vehicle doors.

Other apparatus which has been successful in preventing the vehicle door from contacting the sidewall panels is disclosed in U.S. Pat. No. 5,239,933. U.S. Pat. No. 5,239,933 disclosed a bumper guard which is a single piece of plastic, such as vinyl or polyethylene, or other suitable material which is extruded into a preformed shape. The bumper guard includes a mounting base which has slots for the insertion of a fastener for attachment to the sidewall panel, and a bumper extending from the mounting base which prevents the vehicle door from contacting the sidewall panels. Numerous types of fasteners can be inserted in the slots of the mounting base and through the sidewall panel holes, thereby securing the bumper guard to the sidewall panel. Other similar types of devices have also been developed. One problem with the bumper guard disclosed in U.S. Pat. No. 5,239,933 is that in high or extreme heat (i.e., such as above 90 degrees Fahrenheit), when the vehicle door contacts the bumper, the bumper tends to bend toward the mounting base or sidewall panel due to the fact that the plastic material tends to soften at higher temperatures, and in some instances allows the vehicle door to contact the sidewall panel. Accordingly, there is a need for an improved auto rack sidewall panel bumper guard.

SUMMARY OF THE INVENTION

The present invention solves the above problem by providing an improved auto rack sidewall panel bumper guard for auto rack railroad cars which eliminates contact between the vehicle door and the sidewall panel even in extreme heat. The improved bumper guard of the present invention generally includes a pair of opposed mounting bases, a pair of extension arms connected to the mounting bases and a contact member connected to the arms opposite the mounting bases. The contact member has a lesser thickness than the arms to absorb the forces of the vehicle doors which engage the contact member.

It is therefore an object of the present invention to provide an improved auto rack railroad car sidewall panel bumper guard.

Other objects, features and advantages of the present invention will be apparent from the following detailed disclosure, taken in conjunction with the accompanying sheets of drawings, wherein like reference numerals refer to like parts.

DETAILED DESCRIPTION OF THE INVENTION

Figure 1:
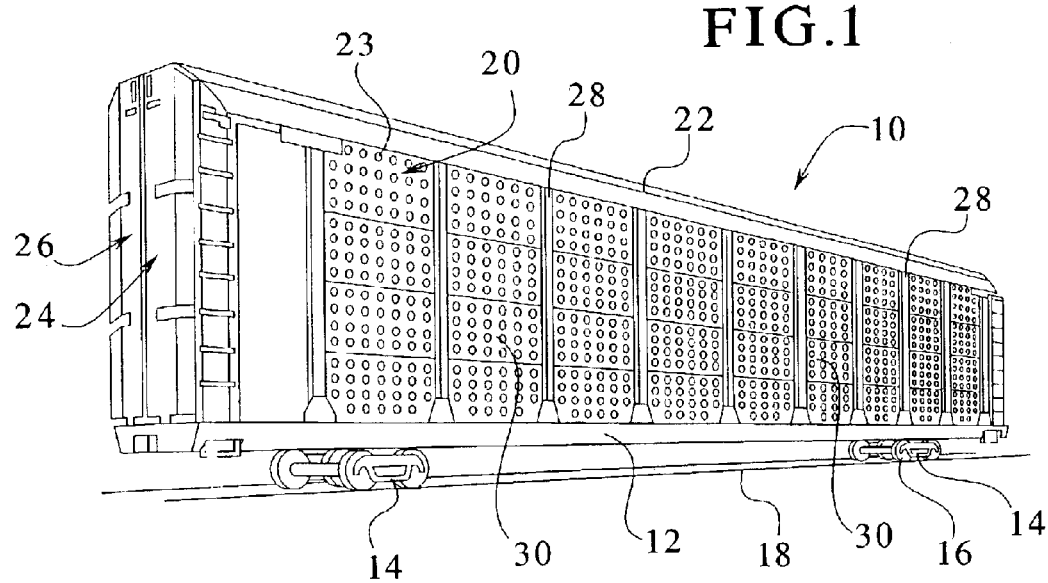
FIG. 1 is a perspective view of an auto rack railroad car.
Figure 2:
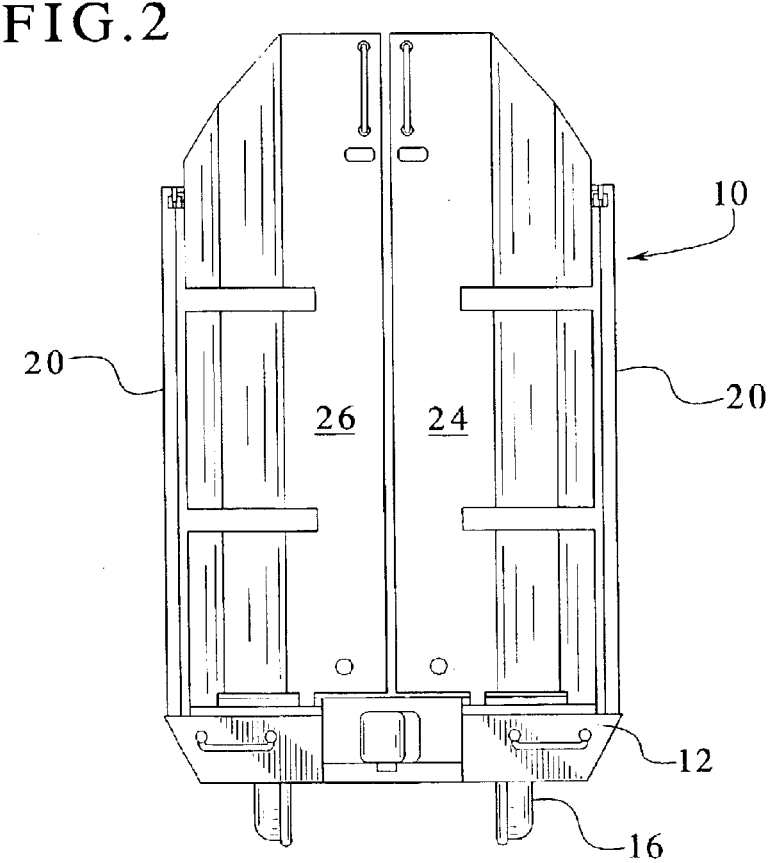
FIG. 2 is an end view of an auto rack railroad car.

Referring now to the drawings, and particularly to FIGS. 1 and 2, a typical auto rack car 10 includes a frame 12 supported by trucks 14, each of which have several wheels 16 which roll along railroad tracks 18. The frame 12 supports two sidewalls 20 and a roof 22. The auto rack car 10 includes a pair of coacting clamshell doors 24 and 26 mounted on each end of the auto rack car 10. The doors 24 and 26 are opened to facilitate the loading and unloading of vehicles into and out of the auto rack car 10 and are closed during transport or storage of the vehicles.

The sidewalls 20 include a series of steel vertical posts 28 which are mounted on and extend upwardly from the frame 12. The roof 22 is mounted on and supported by these vertical posts. The vertical posts are evenly spaced along the entire length of both sidewalls 20 of the auto rack car 10. A plurality of rectangular galvanized steel sidewall panels 30 which extend horizontally and are vertically spaced apart are mounted between each pair of vertical posts 28. These sidewall panels are supported at their corners by brackets (not shown) that are suitably secured to the vertical posts. The average sidewall panel has a multiplicity of round sidewall panel holes 23 that are approximately five-eighths of an inch in diameter. These sidewall panel holes 23 provide the auto rack car with natural light as well as proper ventilation. Proper ventilation prevents harm from the toxic vehicle fumes to the person or persons loading or unloading the vehicles into or out of the auto rack car.

The auto rack car may be a tri-level car having first, second and third levels. Normally, eighteen passenger vehicles can be transported in a tri-level auto rack car, six on each level. The auto rack car can also have two levels for vehicles instead of three. The bi-level auto rack car has a lower level and an upper level. The bi-level auto rack car is generally used to transport larger vehicles, such as vans, mini-vans, pickup trucks, and four-by-four vehicles. The bi-level auto rack car can usually transport twelve of these vehicles, six on each level.

The sidewall panels are individually attached by the brackets (not shown) to the vertical posts at each corner of the sidewall panel such that horizontally extending gaps 70 (see FIG. 5) exist between adjacent sidewall panels. These sidewall panel gaps generally vary in size from about one and a half inches to two and a half inches, depending on the original construction, movement, and thermal expansion of the auto rack cars. Vertically extending gaps (not shown) are disposed between the sidewall panels and the vertical posts. The vertically extending gaps range from approximately one-half inch to one inch, depending on the original construction, movement, and thermal expansion of the auto rack cars. A roof gap (not shown) is also defined between the uppermost sidewall panel and the roof. The roof gap ranges from one-half inch to two and a half inches, also depending on the original construction, movement, and thermal expansion of the auto rack cars. A floor gap (not shown) is also defined between the lowermost sidewall panel and the floor of the first-level. The floor gap ranges from one-half inch to two and one-half inches, likewise depending on the original construction, movement, and thermal expansion of the auto rack car. The auto rack car is constructed with these gaps for several reasons. The sidewall panels are galvanized steel and the vertical posts are painted steel. Hence, the sidewall panels and the vertical posts expand as the temperature increases and contract as the temperature decreases. The construction of the sidewall panels allows for this thermal expansion and contraction. Furthermore, the auto rack car is constantly shimmying, swaying, twisting, and rocking when in transit. The construction of the vertical posts and the attachment of the sidewall panels allow for this movement without structural damage to the entire car and without scraping the paint or galvanized coating off these parts.

Figure 3:
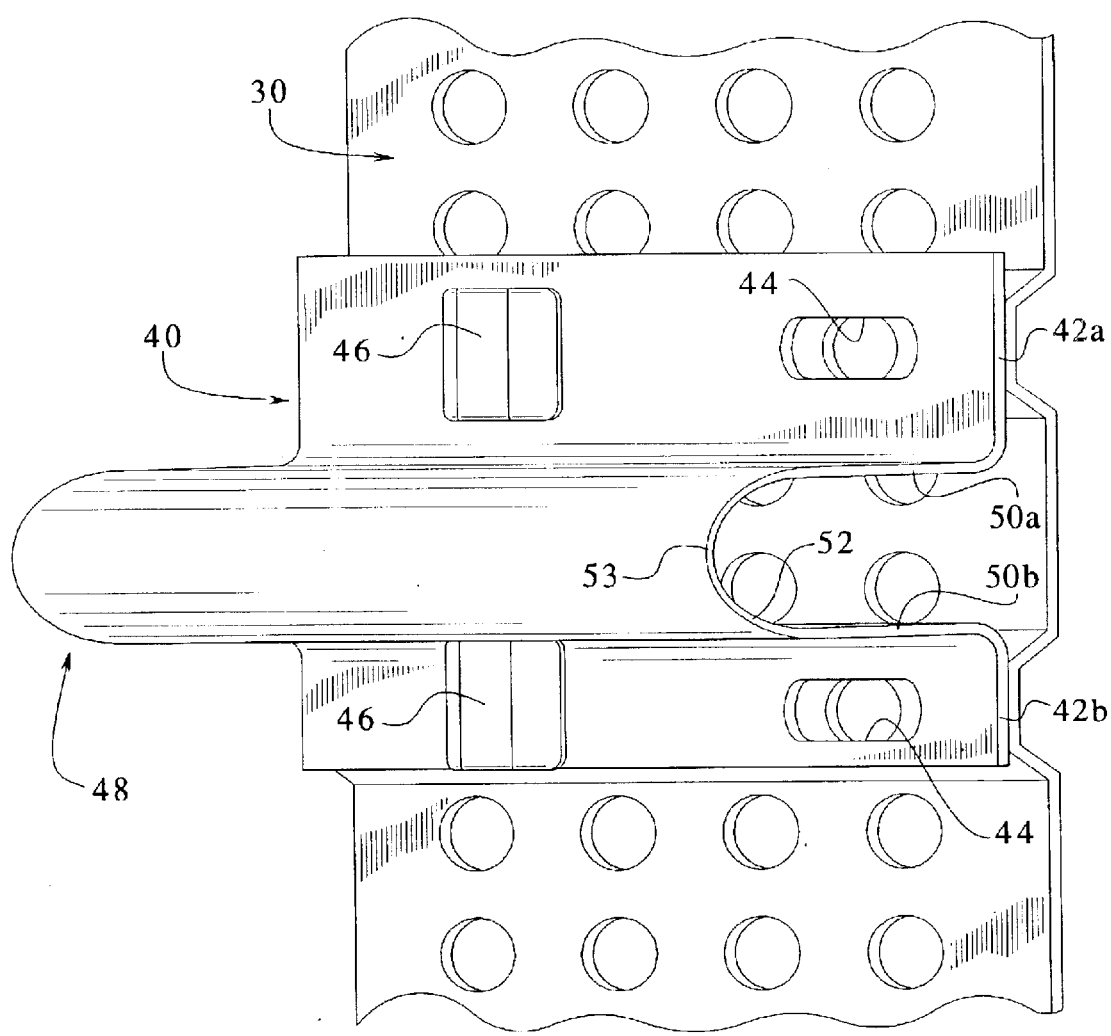
FIG. 3 is a perspective view of a bumper guard of one embodiment of the present invention mounted on a section of an auto rack sidewall panel
Figure 4:
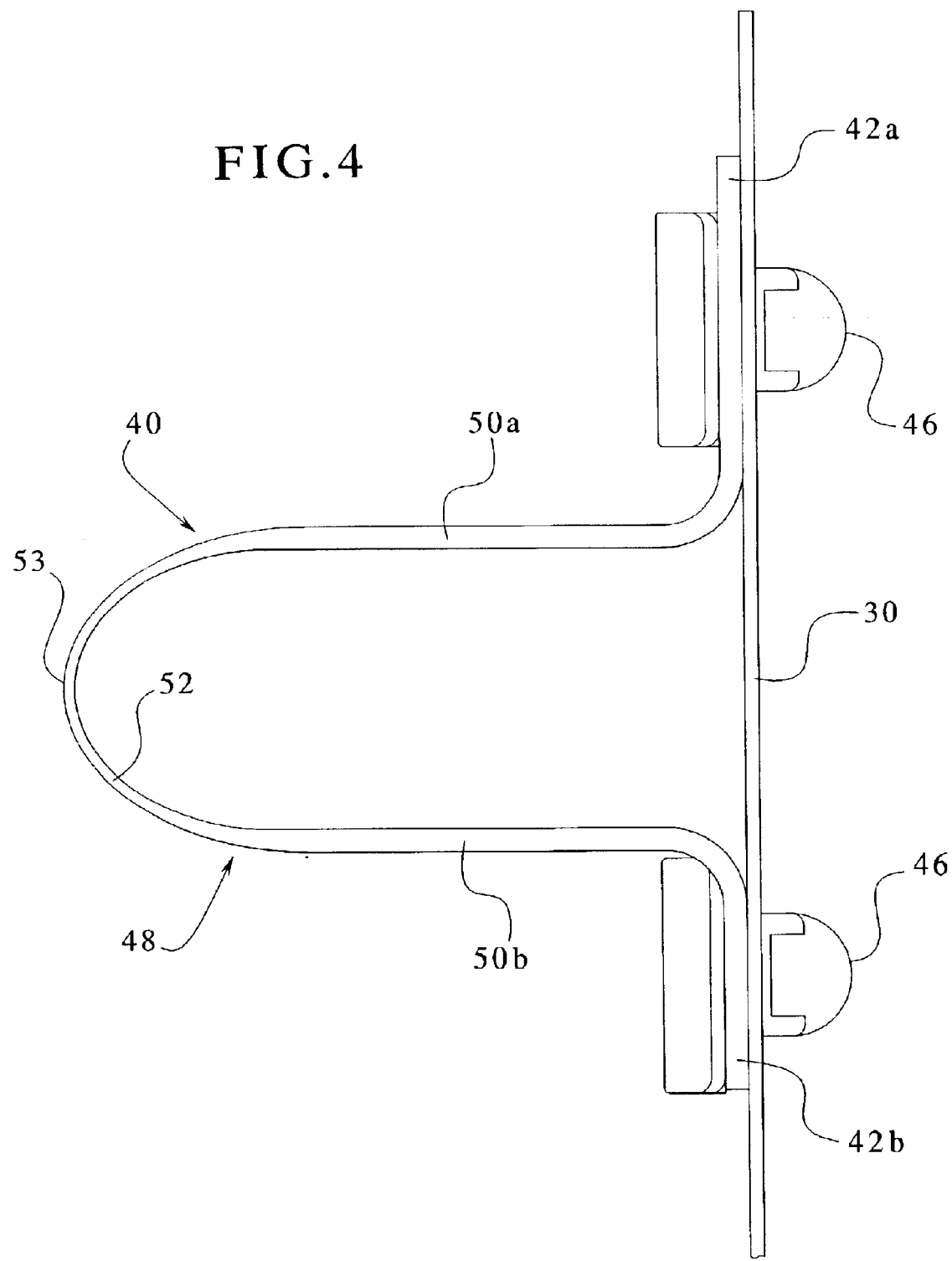
FIG. 4 is an end view of the bumper guard of FIG. 3 mounted on a section of an auto rack sidewall panel.

The bumper guard 40 of one embodiment of the invention is generally illustrated in FIGS. 3 and 4 mounted on a sidewall panel 30. Bumper guard 40 is preferably an elongated extruded plastic member which includes a first mounting base 42a and a second mounting base 42b which are adapted to be connected to the sidewall panel 30. Each mounting base has a series of longitudinally spaced slots 44 of about one-and-three-quarters inches long and five-eighths inch high for aligning with and coacting with sidewall panel holes 23 to receive suitable fasteners 46 when the bumper guard 40 is mounted on a sidewall panel 30. Any suitable fastener may be used to attach the bumper guard to the sidewall panel. The slots allow for expansion and contraction of the bumper guard 40 and facilitate the mounting and aligning with panel holes.

The bumper guard 40 has a bumper 48 which transversely extends or projects from the first and second mounting bases 42a and 42b. The bumper 48 is adapted to absorb the impact energy of a vehicle door (not shown) and prevents the vehicle door from contacting the sidewall panel 30. The bumper 48 is preferably, extruded from a plastic, as described below, to give the desired flexibility and resiliency to absorb impact forces from a vehicle door without causing any damage to the door or finish thereof.

The bumper 48 includes a first extension section or arm 50a extending transversely from the first mounting base 42a and a second extension section or arm 50b extending transversely from the second mounting base 42b. The first and second arms 50a and 50b are preferably in spaced apart parallel relation and are preferably of a uniform width, height and thickness. Each arm includes an inner end connected to the mounting base and an outer end opposite the mounting base.

The bumper further includes a substantially C-shaped contact section or hand 52 connected to the outer ends of the first and second arms. The C-shaped hand has a thickness less than the thickness of the arms. More specifically, the C-shaped section 52 is preferably integrally formed with the arms 50a and 50b, wherein the walls of the C-shaped section are tapered toward a blight portion 53. The C-shaped section has a lesser thickness to enable the section to be pushed inwardly when the vehicle door engages the C-shaped contact section 52, which prevents the vehicle door from contacting the sidewall panel. In hot weather, this improved bumper guard will not fold against the sidewall panel. Accordingly, the thicker 50a and 50b arms prevent the bumper 48 from collapsing while the C-shaped section 52 absorbs the impact of the vehicle door.

The bumper guard may be made and is preferably extruded from a recyclable Low Density Polyethylene of approximately a sixty D (60D) durometer hardness rating. The bumper guard also preferably has a UV inhibitor which incorporates a suitable hindered amine light stabilizer. The UV inhibitor prevents the deterioration of the bumper guard from ultraviolet rays. Other UV inhibitors could be used in the bumper guard. It should also be appreciated that since the bumper guard is mounted inside the auto rack car instead of on the outside, it is partially protected from the damaging ultraviolet rays.

It should also be appreciated that the bumper guard could be made from other suitable materials such as an extruded rubber, urethane, flexible PVC, or a combination of rigid and flexible PVC. It should thus be appreciated that the arms could be made of a more rigid material than the C-shaped section.

Figure 5:
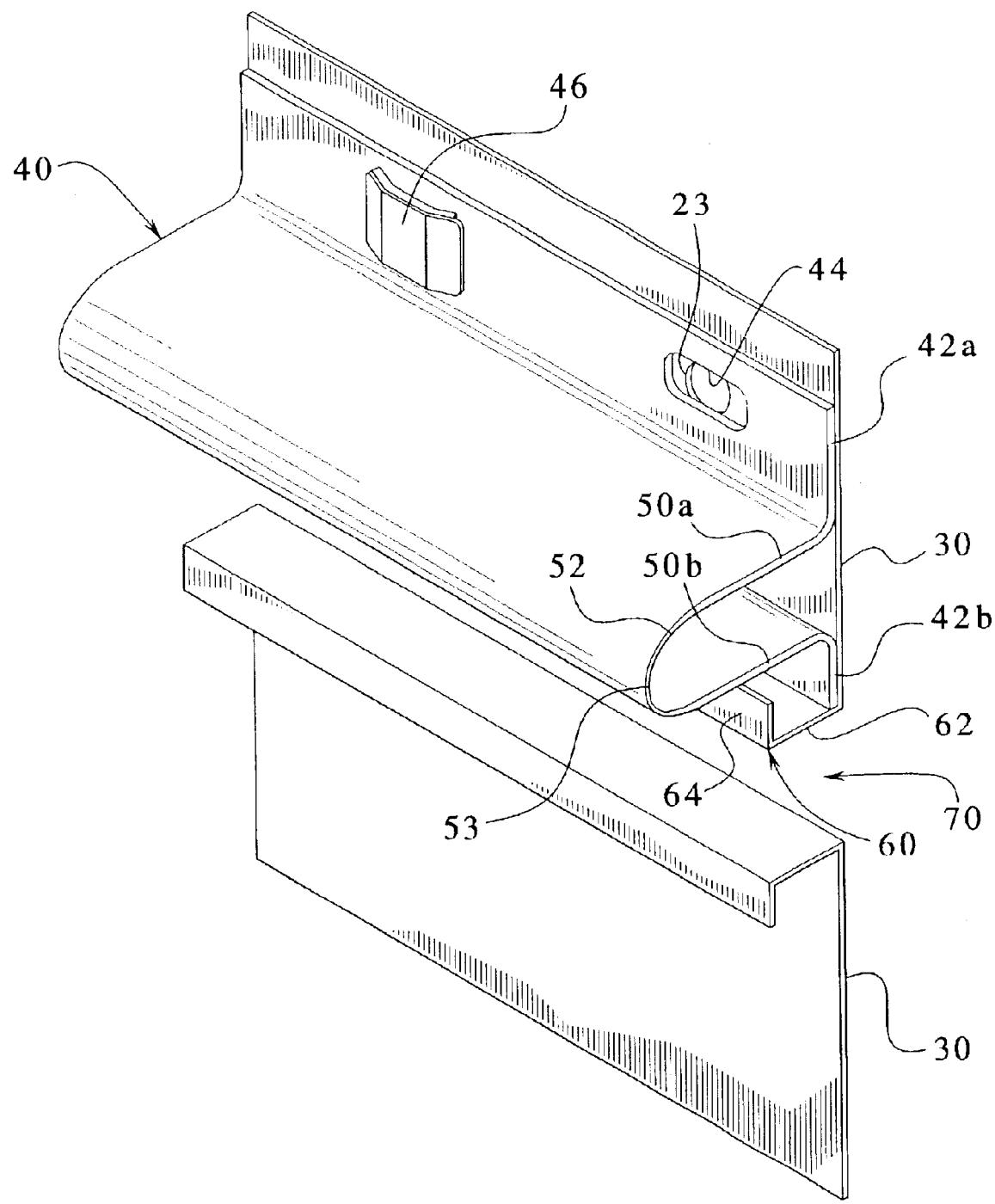
FIG. 5 is a perspective view of a second embodiment of the bumper guard of the present invention mounted on a section of an auto rack sidewall panel adjacent to a gap between two sidewall panels.
Figure 6:
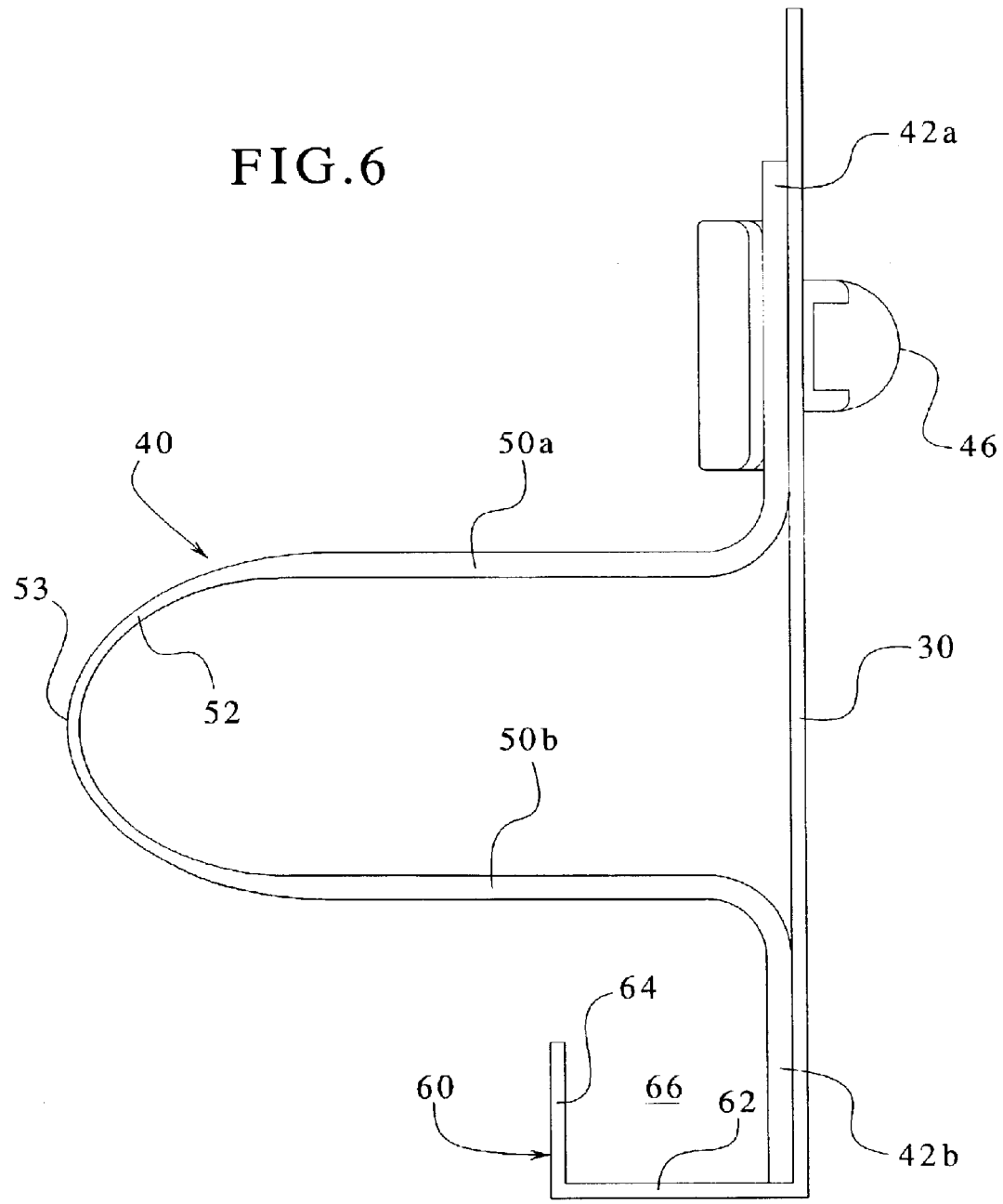
FIG. 6 is an end view of the second embodiment of the bumper guard of FIG. 5 mounted on a section of an auto rack sidewall panel adjacent to a gap between two sidewall panels.

Referring now to FIGS. 5 and 6, each sidewall panel is horizontally corrugated (not shown) and has an L-shaped flange 60 extending around the periphery of each side. The L-shaped flange has a first member 62 which is connected to the sidewall panel wall and lies substantially perpendicular to the panel wall. A second member 64 is connected to the first member and extends substantially perpendicular to the first member 62 and is thus substantially parallel to the sidewall panel 30.

The bumper guard 40 is illustrated in FIGS. 5 and 6 and is similar to the bumper guard 40 illustrated in FIGS. 3 and 4; however, the bumper guard shown in FIGS. 5 and 6 is mounted on a sidewall panel 30 adjacent to a gap between two sidewall panels 30. In particular the bumper guard includes a first mounting base 42a, a second mounting base 42b, a first extension arm 50a, a second extension arm 50b and a contact section 52. The mounting base 42b is inserted into the pocket 66 formed by the first member 62 and second member 64 or the flange 60. The first mounting base is mounted to the sidewall panel using fasteners 46. In this mounting method when a vehicle (not shown) contacts the contact section 52, if the mounting base is forced inwardly toward the car, the flange and in particular the second member 64 of the flange prevents the mounting base 42b from being dislodged from the sidewall panel. Accordingly, this prevents the bumper from bending and prevents the vehicle door from contacting the sidewall panel. It should be appreciated that the mounting base 42b may include mounting slots or may not include mounting slots. It should also be appreciated that the bumper guard of the present invention could be used adjacent to the roof or floor gaps (described above) of an auto rack car.

It will be understood that modifications and variations may be effected without departing from the scope of the novel concepts of the present invention, and it is understood that this application is to be limited only by the scope of the claims.

What is claimed is:

1. In an auto rack railroad car having opposed walls each including a plurality of horizontal extending sidewall panels and sidewall panel holes in said sidewall panels, and wherein the sidewall panels have a wall, an L-shaped flange extending around the periphery of the sidewall panels, and the L-shaped flange has a first member which is connected to the wall and lies substantially perpendicular to the wall and a second member which is connected to the first member and extends substantially perpendicular to the first member and is substantially parallel to the wall, thereby forming a pocket in the L-shaped flange, a bumper guard mounted on the sidewall panels for preventing a vehicle door form contacting said sidewall panels, said bumper guard comprising:

a first mounting base and a second mounting base spaced apart from the first mounting base, wherein the first mounting base has at least ore slot for aligning with and co-acting with a sidewall panel hole to receive a fastener when the bumper guard is mounted on the sidewall panel, and the second mounting base is adapted to be inserted into the pocket of the L-shaped flange of the sidewall panel; and a bumper which transversely extends from the first and second mounting bases, wherein the bumper includes a first extension arm extending transversely from the first mounting base, a second extension arm extending transversely from the second mounting base, each extension arm including an inner end connected to the respective mounting base and an outer end opposite the respective mounting base, and a substantially C-shaped contact section having walls connected to the outer ends of the first and second arms.

2. The apparatus of claim 1, wherein the second mounting base includes mounting slots.

3. The apparatus of claim 1, wherein the first and second arms are in spaced apart parallel relation.

4. The apparatus of claim 1, wherein the first and second arms are of a substantially uniform width, height and thickness.

5. The apparatus of claim 4, wherein the C-shaped contact section has a thickness less than the thickness of the extension arms.

6. The apparatus of claim 5, wherein the C-shaped contact section is integrally formed with the arms and wherein the walls of the C-shaped contact section are tapered toward a blight portion.

7. The apparatus of claim 1, wherein the bumper guard is made of plastic.

8. The apparatus of claim 1, wherein the bumper guard is made from a material selected from the group consisting of urethane, rubber, polyethylene, flexible PVC, and a combination of rigid and flexible PVC.

9. The apparatus of claim 8, wherein the bumper guard includes a UV inhibitor.

10. The apparatus of claim 9, wherein the bumper guard includes a hindered amine light stabilizer.

11. The apparatus of claim 10, wherein the bumper guard is made from a low density polyethylene.

12. In an auto rack railroad car having opposed walls each including a plurality of horizontal extending sidewall panels, and wherein the sidewall panels have a wall, an L-shaped flange extending substantially around the periphery of the sidewall panels, said L-shaped flange having a first member connected to the wall and which lies substantially perpendicular to the wall and a second member is connected to the first member and which extends substantially perpendicular to the first member and substantially parallel to the wall, thereby forming a pocket in the L-shaped flange, a bumper guard mounted on the sidewall panels for preventing a vehicle door form contacting said sidewall panels, said bumper guard comprising:

- a first mounting base and a second mounting base spaced apart from the first mounting base, wherein the first mounting base has at least one slot for aligning with and co-acting with a sidewall panel hole to receive a fastener when the bumper guard is mounted on the sidewall panel, and the second mounting base is adapted to be inserted into the pocket of the L-shaped flange of an adjacent sidewall panel;
- a pair of extension arms integrally connected to and transversely extending from a respective one of the mounting bases; and
- a contact member integrally connected to each extension arm, said contact member having a portion with a lesser thickness than the extension arms to absorb forces of the vehicle door.

13. The apparatus of claim 12, wherein the mounting bases, extension arms and contact member define an elongated extruded plastic member.

14. The apparatus of claim 12, wherein one of said extension arms is integrally connected to the first mounting base and said other extension arm is integrally connected to the second mounting base.

15. The apparatus of claim 12, wherein the first mounting base defines a series of horizontally spaced slots adapted to receive fasteners which secure said first mounting base to the sidewall panel.

16. The apparatus of claim 12, wherein the extension arms are in spaced apart parallel relation.

17. The apparatus of claim 12, wherein the contact member is C-shaped and includes a blight portion and the contact member is tapered toward the blight portion.

18. The apparatus of claim 12, wherein the bumper guard is made of plastic.

19. The apparatus of claim 12, wherein the bumper guard is made from a material selected from the group consisting of urethane, rubber, polyethylene, flexible PVC, and a combination of rigid and flexible PVC.

20. The apparatus of claim 12, wherein the bumper guard includes a UV inhibitor.

21. The apparatus of claim 12, wherein the bumper guard includes a hindered amine light stabilizer.

22. The apparatus of claim 12, wherein the bumper guard is made from a low density polyethylene.

23. In an auto rack railroad car having opposed walls each including a plurality of horizontal extending sidewall panels, and wherein the sidewall panels have a wall, an L-shaped flange extending substantially around the periphery of the sidewall panels, said L-shaped flange having a first member connected to the wall and which lies substantially perpendicular to the wall and a second member is connected to the first member and which extends substantially perpendicular to the first member and substantially parallel to the wall, thereby forming a pocket in the L-shaped flange, a bumper guard mounted on the sidewall panels for preventing a vehicle door form contacting said sidewall panels, said bumper guard comprising:

- a mounting base;
- a pair of extension arms integrally connected to and transversely extending from the mounting base; and
- a contact member integrally connected to each extension arm, said contact member having a portion with a lesser thickness than the extension arms to absorb forces of the vehicle door.

24. The apparatus of claim 23, wherein the mounting base, extension arms and contact member define an elongated extruded plastic member.

25. The apparatus of claim 23, wherein the mounting base includes a first mounting base and a second mounting base spaced apart from the first mounting base, wherein one of said extension arms is integrally connected to the first mounting base and said other extension arm is integrally connected to the second mounting base.

26. The apparatus of claim 25, wherein at least one said mounting base defines a series of horizontally spaced slots adapted to receive fasteners which secure said mounting base to the sidewall panel.

27. The apparatus of claim 23, wherein the extension arms are in spaced apart parallel relation.

28. The apparatus of claim 23, wherein the contact member is C-shaped and includes a blight portion and the contact member is tapered toward the blight portion.

29. The apparatus of claim 23, wherein the bumper guard is made of plastic.

30. The apparatus of claim 23, wherein the bumper guard is made from a material selected from the group consisting of urethane, rubber, polyethylene, flexible PVC, and a combination of rigid and flexible PVC.

31. The apparatus of claim 23, wherein the bumper guard includes a UV inhibitor.

32. The apparatus of claim 23, wherein the bumper guard includes a hindered amine light stabilizer.

33. The apparatus of claim 23, wherein the bumper guard is made from a low density polyethylene.

* * * * *

UNITED STATES PATENT AND TRADEMARK OFFICE
CERTIFICATE OF CORRECTION

PATENT NO.         : 6,805,523 B2
APPLICATION NO. : 10/386742
DATED                : October 19, 2004
INVENTOR(S)        : Burke et al.

It is certified that error appears in the above-identified patent and that said Letters Patent is hereby corrected as shown below:

ON THE TITLE PAGE, ITEM [73]

Change the Assignee from "ZefTec" to --ZefTek, Inc.--.

Signed and Sealed this

Twenty-fourth Day of April, 2007

JON W. DUDAS
*Director of the United States Patent and Trademark Office*